United States Patent [19]

Witten

[11] 4,435,661

[45] Mar. 6, 1984

[54] SUBMERSIBLE PUMP MOTOR FLEXIBLE BEARING

[75] Inventor: Raymond L. Witten, Claremore, Okla.

[73] Assignee: Hughes Tool Company, Houston, Tex.

[21] Appl. No.: 376,791

[22] Filed: May 10, 1982

[51] Int. Cl.³ .............................................. H02K 7/08
[52] U.S. Cl. ...................................... 310/90; 310/87; 384/220; 384/280
[58] Field of Search ...................... 310/87, 157, 90, 43; 308/87, 184 R; 384/227, 280, 215, 220, 222, 276, 278; 175/104, 107

[56] References Cited

U.S. PATENT DOCUMENTS

| | | | |
|---|---|---|---|
| 2,173,250 | 9/1939 | Fay | 308/184 |
| 2,576,141 | 11/1951 | Pike | 384/222 |
| 2,857,216 | 7/1955 | Geen | 308/152 |
| 3,107,946 | 10/1963 | Drake | 310/90 UX |
| 3,131,004 | 4/1964 | Sternlicht | 384/312 |
| 3,551,714 | 12/1970 | Boyd | 310/87 |
| 3,601,459 | 8/1971 | Cutting | 308/238 |
| 3,704,922 | 12/1972 | Kleinschmidt | 308/184 R |
| 3,743,365 | 7/1973 | Kato | 308/184 R |
| 4,033,642 | 7/1977 | Sorgatz | 308/184 R |
| 4,119,874 | 10/1978 | Beavers | 384/222 |
| 4,247,156 | 1/1981 | King | 308/26 |

*Primary Examiner*—R. Skudy
*Attorney, Agent, or Firm*—Robert A. Felsman; James E. Bradley

[57] ABSTRACT

A submersible pump electrical motor has a bearing member that is resilient. The submersible pump motor has a stationary stator within which a rotor is rotated. The rotor is divided into sections, with bearings located between each section for maintaining the shaft in alignment. The bearings frictionally engage the stator wall. The bearing has slots extending through its periphery to provide flexibility. The slots incline into the direction of rotation of the shaft to resist rotation of the bearing member.

5 Claims, 2 Drawing Figures

SUBMERSIBLE PUMP MOTOR FLEXIBLE BEARING

BACKGROUND OF THE INVENTION

This invention relates in general to electrical motors for submersible pumps, and in particular to a flexible bearing for maintaining the shaft of the rotor in alignment.

High volume wells, such as for oil or water production, often use a submersible pump. The pump is a centrifugal pump having a submersible motor that rotates a shaft to drive the pump. Often the motors have several hundred horsepower and are from six to sixty feet in length. Each motor has a stator secured within a tubular housing. A rotor secured to a shaft rotates within the stator.

Because of the long length, the rotor is made up of a number of sections. Each section comprises a large number of flat disks called laminations that are secured by copper rods. The sections are spaced-apart from each other, and a bearing is located between each section for maintaining the shaft in axial alignment. The rotor sections are keyed to the shaft for rotation therewith, but are axially movable with respect to the shaft.

Each bearing assembly includes a sleeve keyed to the shaft for rotation therewith. A bearing member has a bore for rotatably receiving the sleeve. The bearing member has a periphery that frictionally engages the inner wall of the stator at operating temperatures to prevent the bearing member from rotating and to support the shaft in alignment.

As the motor heats up to operating temperatures, the bearing member will expand outwardly to frictionally engage the stator. The shaft will also grow longitudinally, causing the bearing member to move longitudinally with respect to the stator. The bearing member must be precisely dimensioned so that it does not engage the stator wall so tightly as to create excessive thrust loads on thrust washers located above and below the bearing member. For accurate dimensioning, the bearing is normally constructed of a metal with an outer wall ground to a 0.0005 inch tolerance. While satisfactory, this high tolerance makes the bearing member expensive. Also, should the bearing begin to spin with the shaft, its metal periphery may cause damage to the stator wall.

SUMMARY OF THE INVENTION

In this invention, a submersible pump electrical motor is provided with a bearing assembly that includes a bearing member that is flexible. The bearing member has an outer portion with a periphery that frictionally engages the stator at operating temperatures. The bearing member outer portion has a plurality of slots that define evenly spaced fingers. Each finger is identical and inclines into the direction of rotation to resist rotation of the bearing member. As the bearing member thermally enlarges, the fingers will grip the stator wall. The fingers will uniformly flex slightly to absorb some of the gripping force so that the bearing is free to slide axially with respect to the stator as the rotor expands longitudinally.

DESCRIPTION OF THE PREFERRED EMBODIMENT

Figure 1:
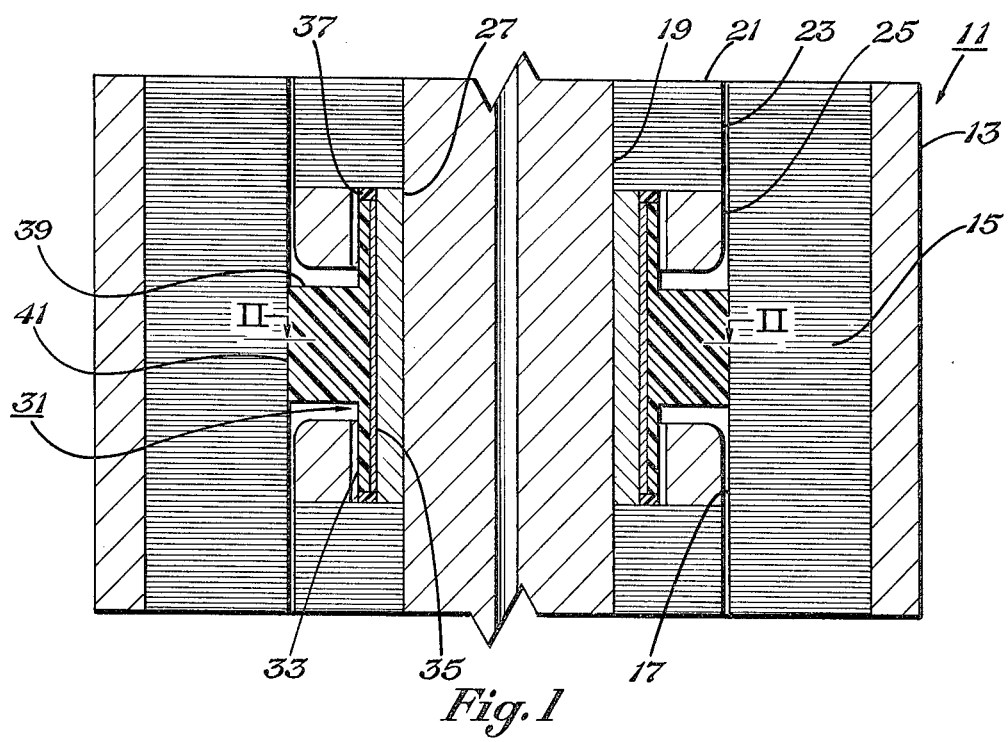
FIG. 1 is a sectional view, taken along the line I—I of FIG. 2, of a motor constructed in accordance with this invention.

Referring to FIG. 1, motor 11 includes a cylindrical housing 13. A stator 15 is rigidly mounted within housing 13. Stator 15 is made up of large number of flat disks called laminations having slots through which wires (not shown) are wound in a conventional manner. Stator 15 has a cylindrical inner wall 17 that is of uniform constant diameter.

A rotor is rotatably mounted within the inner wall 17 of stator 15. The rotor comprises a shaft 19 and a large number of laminations. The laminations are divided into identical rotor sections 21 approximately 15 inches in length, of which a portion of two of the rotor sections 21 are shown. Each rotor section 21 has an outer wall 23 that is closely spaced to the inner wall 17 of stator 15. Each rotor section 21 is secured by copper rods (not shown), with copper end rings 25 on each end. The ends of the copper rods are brazed or mechanically welded to the end rings 25 to hold the laminations in each rotor section 21 together. Each rotor section 21 is secured by a key (not shown) to shaft 19 for rotation therewith. The rotor sections 21 are not individually axially locked to shaft 19. However, the lowermost rotor section 21 at the end of shaft 19 is axially locked to support the rotor sections with respect to shaft 19.

Figure 2:
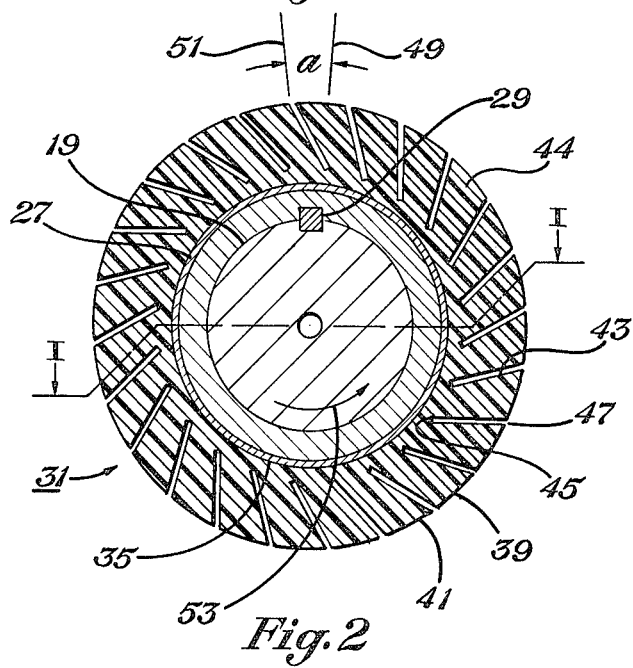
FIG. 2 is a sectional view of the motor of FIG. 1, taken along the line of II—II of FIG. 1.

A bearing assembly is located between each of the rotor sections 21. The bearing assembly includes a sleeve 27 that is secured to shaft 19 for rotation therewith by means of a key 29 (FIG. 2). Sleeve 27 is preferably a bronze cylinder and is not axially locked to shaft 19. The upper edge or circular rim of sleeve 27 contacts the lowermost lamination of the upper rotor section 21. The lower edge of sleeve 27 contacts the uppermost lamination of the lower rotor section 21. Sleeve 27 supports the weight of the rotor sections 21 and transmits any force between one rotor section 21 to the other rotor section 21. Sleeve 27 is carried within an inner bore of ring 25.

A bearing member 31 has a hub or inner portion 33 that is also carried within the inner bore of each end ring 25, with a clearance between the end ring 25 inner diameter and the inner portion 33 outer diameter. Inner portion 33 is cylindrical and has a metal sleeve or liner 35 rigidly secured to an axial bore of the inner portion 33. Liner 35 should be considered as part of bearing member 31 for the purposes herein, and rotatably receives in sliding engagement the outer wall of shaft sleeve 27.

A thrust washer 37 is located around the outer diameter of sleeve 27 and between the upper rotor section 21 and the upper edges of the bearing member inner portion 33 and its liner 35. A similar thrust washer 37 is located between the lower edges of bearing member inner portion 33 and its liner 35 and the lower rotor section 21. Thrust washers 37 are preferably of a nonmetallic material, such as a glass reinforced phenolic material. The distance from the lower side of the lower thrust washer 37 to the upper side of the of upper thrust washer 37 is about 1/32 inch less than the height of shaft sleeve 27. This prevents the thrust washers 37 from bearing the weight of the rotor sections 21 located above.

Referring also to FIG. 2, bearing member 31 has a flange or outer portion 39 that extends radially outward from the inner portion 33. Outer portion 39 has a cylindrical periphery 41 that frictionally engages the inner wall 17 of stator 15 under operating temperatures. The outer diameter of periphery 41 is no greater and preferably equal to the inner diameter of stator wall 17. The longitudinal thickness of the outer portion 39 is less than the distance between two adjacent end rings 25. Bearing member 31 is a hard, resilient material preferably constructed of a thermoplastic or thermosetting type material. The material for bearing member 31 is not an elastomeric or easily deformable type of material because it must provide rigid support for shaft 19.

As shown in FIG. 2, a plurality of slots 43 are formed in outer portion 39. Slots 43 extend completely through the outer portion 39 to the periphery 41, defining fingers or vanes 44. Each slot is of identical width, length and orientation to the other slots 43, defining identical fingers 44. Each slot 43 inclines into the direction of rotation. The inner end 45 of each slot lags the outer end 47 of each slot, considering the direction of rotation of shaft 19, indicated by arrow 53. A radial line 49 drawn from the axis of shaft 19 through inner end 45 thus lags a similar radial line 51 drawn through the outer end 47 of slot 43. The circumferential distance between lines 49 and 51 is proportional to an angle a that is about 10 degrees in the preferred embodiment. Each slot 43 is located on a straight line. The outer end 47 of each slot 43 intersects radial line 51 at an angle of about 25 degrees. The inner end of each slot 43 intersects radial line 49 at an angle of about 35 degrees.

The inclination of the slots 43 into the direction of rotation results in fingers 44 having widths greater at the periphery 41 than at the inner ends 45 of the slots 43. The width of the slots 43 is much less than the width of the fingers 44. In the embodiment shown in the drawings, the fingers 44 at the periphery 41 are about eight times as wide as the slots 43.

In operation, current from an uphole power source is supplied to the windings of stator 15 causing the shaft 19 and sleeve 27 to rotate. Initially, bearing member outer portion 39 will not be under any radial compression. Slight frictional engagement of the bearing outer portion 39 with stator inner wall 17, however, will prevent bearing member 31 from rotating with the shaft 19 at start up. Once the motor begins to warm-up, bearing outer portion 39 will thermally expand outward and frictionally engage the stator wall 17 with greater force, further preventing rotation and providing support for shaft 19. The sleeve 27 will rotate within the liner 35 of the bearing member 31. The housing 13 will be filled with oil, and this oil will circulate through the slots 43 during initial filling and during operation.

As the motor begins to heat up, the shaft 19 grows or enlarges longitudinally. During growth, the bearing member 31 will move with rotor sections 21, and may slide longitudinally along stator 15. The slots 43 allow the fingers 44 to flex inwardly slightly, with the slots 43 closing slightly. This flexing provides resiliency for bearing member 31. The resiliency of the fingers 44 absorbs some of the outward expansion forces to allow adequate gripping to prevent rotation of the bearing member 31. The resiliency also allows vertical sliding movement of the bearing member 31 with respect to the stator inner wall 17 without placing excessive axial loads on the thrust washers 27.

The invention has significant advantages. Because of the resiliency of the bearing member, a wider range of tolerances for the outer diameter are possible. Conventional lathe turning of the periphery of the bearing member can be used, as opposed to the prior art grinding operations for solid, nonflexible bearings. The flexible bearing member provides a more constant force against the stator inner wall than a solid nonflexible bearing, because the stator wall often has slightly varying lamination bore dimensions. The large slot area for flow of lubricating oil also aids in heat dissipation of the bearing. The spring action of the fingers absorb some of the gripping power, allowing the bearing to more easily move axially with respect to the stator inner wall as the rotor thermally increases in length. This avoids abnormal thrust loads placed on the thrust washers. Also, should the bearing begin to spin with the rotor, the thermoplastic periphery would likely create little or no damage to the stator inner wall.

While the invention has been shown in only one of its forms, it should be apparent to those skilled in the art that it is not so limited but is susceptible to various changes without departing from the scope of the invention.

I claim:

1. In a submersible pump electrical motor having a rotor shaft with laminations placed in sections and rotated within a stator, an improved bearing means between the sections for supporting the shaft, comprising in combination:
 a symmetrical bearing member including at least one sleeve having a cylindrical bore containing the sleeve through which the shaft passes and a plurality of fingers engaging inner periphery of the stator, each finger inclining considering the direction of rotation of the shaft.

2. In a submersible pump electrical motor having a rotor shaft with laminations placed in sections and rotated within a stator, an improved bearing means between the sections for supporting the shaft, comprising in combination:
 a resilient bearing member including at least one sleeve having a cylindrical bore containing the sleeve through which the shaft passes and a plurality of identical fingers evenly spaced around the bearing member and engaging the stator, each finger inclining identically toward the direction of rotation of the shaft.

3. In a submersible pump electrical motor having a rotor shaft with laminations placed in sections and rotated within a stator, an improved bearing means between the sections for supporting the shaft, comprising in combination:
 a sleeve secured to the shaft for rotation therewith;
 a bearing member having a cylindrical bore that rotatably receives the sleeve and a periphery of the bearing member engaging the stator; and
 a plurality of slots spaced around the bearing member, each slot having an outer end intersecting the periphery of the bearing member and an inner end of the slot positioned such that a radial line passing through the inner end is spaced from a radial line passing through the outer end.

4. In a submersible pump electrical motor having a rotor shaft with laminations placed in sections and rotated within a stator, an improved bearing means between the sections for supporting the shaft, comprising in combination:
- a sleeve secured to the shaft for rotation therewith;
- a bearing member having an inner portion that rotatably receives the sleeve and a resilient, symmetrical outer portion of the bearing member having a periphery that engages the stator; and
- a plurality of slots spaced around and extending through the outer portion, defining fingers between each slot that are much greater in width than the slots, each slot having an outer end intersecting the periphery of the bearing member and an inner end of the slot positioned such that a radial line passing through the inner end lags a radial line passing through the outer end, of the slot considering the direction of rotation of the shaft.

5. In a submersible pump electrical motor having a rotor shaft with laminations placed in sections and rotated within the inner diameter of the stator, an improved bearing means between the sections for supporting the shaft, comprising in combination:
- a bearing member having a cylindrical bore through which the shaft passes and a periphery that engages the stator but is no greater in diameter than the inner diameter of the stator, the bearing member being under no radial compression at initial assembly of the bearing member in the stator, but being of a material that thermally expands at operating temperatures, causing the periphery of the bearing member to exert a force against the stator; and
- slot means in the bearing member for limiting the force imposed by the bearing member against the stator to a level that allows the bearing member to slide axially along the inner diameter of the stator without incurring axial forces above a selected minimum, the slot means being a plurality of slots extending inward from the periphery that are inclined with respect to radial lines of the shaft.

* * * * *